C. O & J. H. Ritchie.
Press.

N° 76101.   Patented Mar. 31, 1868.

Witnesses.                              Inventors.
Theo D Christopher              C O Ritchie and J H Ritchie
Franklin Read                       Per A. M. Connett & Bro.

United States Patent Office.

CHARLES O. RITCHIE AND JAMES H. RITCHIE, OF NORTH MADISON, INDIANA.

Letters Patent No. 76,101, dated March 31, 1868.

IMPROVED PRESS.

*The Schedule referred to in these Letters Patent and making part of the same.*

TO ALL WHOM IT MAY CONCERN:

Be it known that we, CHARLES O. RITCHIE and JAMES H. RITCHIE, both of North Madison, in the county of Jefferson, and State of Indiana, have invented new and useful Improvements in Presses; and we do hereby declare that the following is a full, clear, and exact description thereof, which will enable those skilled in the art to make and use the same, reference being had to the accompanying drawings, forming part of this specification.

The object of this invention is to construct a simple, convenient, and cheap press, one that will be complete in itself, to be used as a tobacco, lard, or cider-press, or any purpose of the above nature.

Similar letters of reference indicate corresponding parts.

A is the base of the press, and B B are standards attached firmly to it. These standards are slotted, as shown, the openings corresponding with similar ones in the uprights C C. Through these slots are passed the clamp-bolts $a\ a$. The uprights C C are bent inward at the top, to form a fulcrum for the lever D, which is pivoted on the bolt $b$.

G is the chamber or matrix of the press. This chamber is formed of the metallic end-plates $m\ m$, each pierced with four holes, for the reception of the rods $c\ c$, which are threaded on their ends, and have suitable nuts, as shown. The sides and bottom of the chamber are of wood, and are held in place by the rods $c\ c$.

It will readily be seen that, by loosening the nuts on the rods $c\ c$, the sides and bottom may be taken out and replaced at pleasure.

E is a follower, of wood, with a metallic plate on top, for the cam on the lever D to operate against.

Figure 1:
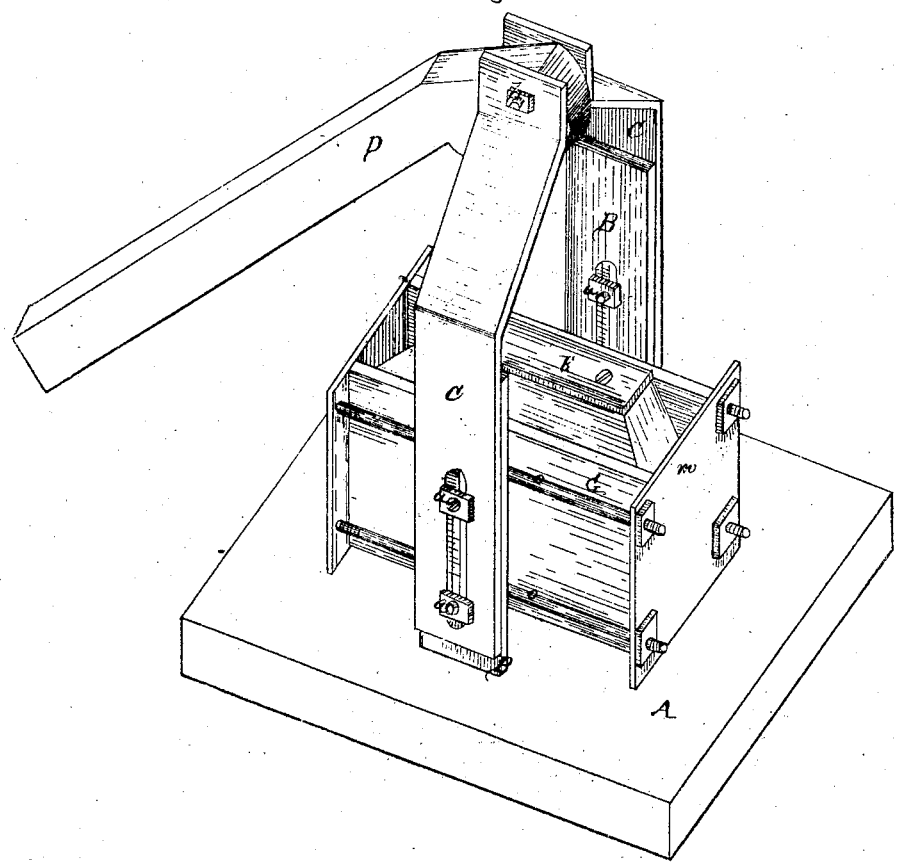
Figure 1 is a perspective view of the press.
Figure 2:
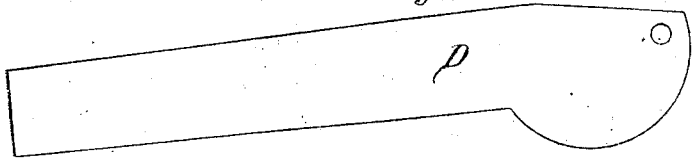
Figure 2 is a side elevation of the cam-lever.

In fig. 2 is shown the lever D in elevation. The end of this lever is formed into a cam, as shown, both lever and cam being of one piece of metal.

Operation.

When it is desired to use this press, the substance to be operated upon is placed in the chamber G, the follower is put on, and the lever D then brought down, which operation causes the cam to press the follower down into the chamber, with great force, for a short distance. The lever is then lifted, and the clamp-nuts $a\ a$ loosened, which allows the standards or uprights C C to be lowered, and, through them, the fulcrum $b$ of the cam. The clamp-nuts are now tightened, and the lever brought down again, as before, pressing the follower down further. This operation may be repeated as often as necessary.

When the substance is sufficiently pressed, the follower is taken out, and the nuts on the rods $c\ c$ loosened, thus allowing the substance pressed to be removed with ease. The sides and bottom may also be removed for cleaning, if desired.

Having thus described our invention, what we claim as new, and desire to secure by Letters Patent, is—

An improved press, composed of the matrix G, provided with binding-rods $c\ c$, the follower E, the slotted uprights B and C, with their set-screws, and the cam-lever D, all combined and arranged substantially as and for the purposes shown and described.

CHARLES O. RITCHIE,
JAMES H. RITCHIE.

Witnesses:
HENRY CONNETT, Jr.,
THEO. D. CHRISTOPHER.